United States Patent
Yen et al.

(10) Patent No.: US 8,964,603 B2
(45) Date of Patent: Feb. 24, 2015

(54) METHOD OF UNIFIED PARAMETER MAPPING

(75) Inventors: Chia-Wei Yen, Taipei (TW); Jian-Li Mao, Suzhou (CN)

(73) Assignee: ECONET (Suzhou) Limited, Suzhou IndustrialPark, Suzhou, Jiangsu Province (CN)

( * ) Notice: Subject to any disclaimer, the term of this patent is extended or adjusted under 35 U.S.C. 154(b) by 246 days.

(21) Appl. No.: 13/563,699

(22) Filed: Jul. 31, 2012

(65) Prior Publication Data

US 2013/0034022 A1 Feb. 7, 2013

Related U.S. Application Data

(60) Provisional application No. 61/515,969, filed on Aug. 7, 2011.

(51) Int. Cl.
| | |
|---|---|
| *H04L 12/28* | (2006.01) |
| *H04L 12/24* | (2006.01) |
| *H04L 29/12* | (2006.01) |

(52) U.S. Cl.
CPC ........... *H04L 41/022* (2013.01); *H04L 61/6077* (2013.01)
USPC ............ 370/255; 370/338; 370/431; 370/469

(58) Field of Classification Search
CPC .................................................. H04L 41/022
USPC .................................. 370/255, 338, 431, 469
See application file for complete search history.

(56) References Cited

U.S. PATENT DOCUMENTS

| | | | |
|---|---|---|---|
| 6,560,234 B1 | 5/2003 | Ben-Michael | |
| 7,792,141 B2* | 9/2010 | Aldaz et al. | 370/463 |
| 8,498,248 B2* | 7/2013 | Zheng et al. | 370/329 |
| 8,601,053 B2* | 12/2013 | Mehrotra et al. | 709/203 |
| 2003/0053467 A1* | 3/2003 | Miyamoto | 370/401 |
| 2004/0218586 A1 | 11/2004 | Khoury | |
| 2005/0286451 A1* | 12/2005 | Kim et al. | 370/310 |
| 2006/0034233 A1* | 2/2006 | Strutt et al. | 370/338 |
| 2006/0186973 A1* | 8/2006 | Satou | 333/260 |
| 2006/0215656 A1* | 9/2006 | Shirogane | 370/389 |
| 2008/0175265 A1* | 7/2008 | Yonge et al. | 370/447 |
| 2008/0288986 A1* | 11/2008 | Foster et al. | 725/62 |
| 2009/0047963 A1 | 2/2009 | Kim | |
| 2009/0323608 A1* | 12/2009 | Adachi et al. | 370/329 |
| 2010/0153808 A1* | 6/2010 | Lee et al. | 714/749 |
| 2010/0254282 A1* | 10/2010 | Chan et al. | 370/253 |
| 2011/0149897 A1* | 6/2011 | Youn et al. | 370/329 |
| 2012/0311683 A1* | 12/2012 | Klein et al. | 726/6 |

* cited by examiner

*Primary Examiner* — Andrew Lai
*Assistant Examiner* — Andrew C Lee
(74) *Attorney, Agent, or Firm* — Winston Hsu; Scott Margo

(57) ABSTRACT

A method of unified parameter mapping for a communication device comprising a medium access control (MAC) abstraction sub-layer for converging a plurality of media in a network system is disclosed. The method comprises obtaining a unified parameter and value of the unified parameter from an upper layer of the MAC abstraction sub-layer, and a medium type of a MAC layer underlying the MAC abstraction sub-layer, determining a special parameter for configuration of the medium type of the MAC layer and a format of the special parameter according to the medium type of the MAC layer and the unified parameter, and generating value of the special parameter according to the value of the unified parameter and the format of the special parameter.

8 Claims, 7 Drawing Sheets

| Parameter index | Parameter name | Parameter value |
|---|---|---|
| 1 | UNID | xxx |
| 2 | UNK | yyy |
| ……… | ……… | ……… |
| N | | |

400

| MAC Type index | MAC Type name |
|---|---|
| 1 | WiFi |
| 2 | PLC |
| 3 | MoCA |
| 4 | Ethernet |
| ……… | ……… |
| M | |

METHOD OF UNIFIED PARAMETER MAPPING

CROSS REFERENCE TO RELATED APPLICATIONS

This application claims the benefit of U.S. Provisional Application No. 61/515,969, filed on Aug. 7, 2011, entitled "Unified Parameter Mapping Method", the contents of which are incorporated herein in their entirety.

BACKGROUND

With rapidly growing of user's needs for accessing digital contents everywhere, various communication technologies have been developed for transmission of the digital contents. These communication technologies may be developed for different environments, different transmission speeds and/or different user requirements. In addition, several medium access control (MAC) protocols are established based on different communication standards, which define different communication methods based on heterogeneous mediums. For example, IEEE 1901 communication standard is used for power line (PLC), IEEE 802.11 communication standard is used for wireless communication (i.e. WiFi), IEEE 802.3 communication standard is used for Ethernet, and Multimedia over Coax Alliance (MoCA) communication standard is used for coaxial cables, and so on.

As a result, a MAC abstraction sub-layer is developed for convergence of these various media. Please refer to FIG. 1, which is a schematic diagram of an exemplary communication device 10 in a data plane. The communication device 10 may be a mobile phone, laptop, tablet computer, electronic book, modem, or portable computer system, and uses various media for communication. In FIG. 1, the MAC abstraction sub-layer is arranged between an upper layer and a plurality of MAC types of a MAC layer each corresponding to a medium specification (i.e. PLC, WiFi, MoCA, or Ethernet). The upper layer can be a network layer, a transport layer, an application layer or any layer responsible for processing the signalings and the packets received from the MAC abstraction sub-layer, and signalings and packets to be transmitted via the MAC abstraction sub-layer.

In addition, the MAC abstraction sub-layer shall be able to provide a unified MAC configuration experience to users. That is, a user does not separately configure the MAC parameters for the various MAC types (e.g. PLC, WiFi, MoCA, or Ethernet) of the underlying MAC layer, to conform with the MAC parameter settings (i.e. format, length, type, etc.) of the MAC types of the MAC layer. However, there is no guideline for a unified MAC parameter mapping to a specific MAC type parameter. Without clear mapping method, the MAC abstraction sub-layer may use the unified MAC parameter to configure the underlying MAC layer, which may not conform to a parameter setting of a MAC type of the underlying MAC layer, and thereby causing improper configuration and/or system error.

SUMMARY

The present invention therefore provides a method of unified parameter mapping, to solve the abovementioned problems.

The present invention discloses a method of unified parameter mapping for a communication device comprising a medium access control (MAC) abstraction sub-layer for converging a plurality of media in a network system. The method comprises obtaining a unified parameter and value of the unified parameter from an upper layer of the MAC abstraction sub-layer, and a medium type of a MAC layer underlying the MAC abstraction sub-layer, determining a special parameter for configuration of the medium type of the MAC layer and a format of the special parameter according to the medium type of the MAC layer and the unified parameter, and generating value of the special parameter according to the value of the unified parameter and the format of the special parameter.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a unified parameter table and a MAC type table according to an example of the present invention

DETAILED DESCRIPTION

Figure 1:
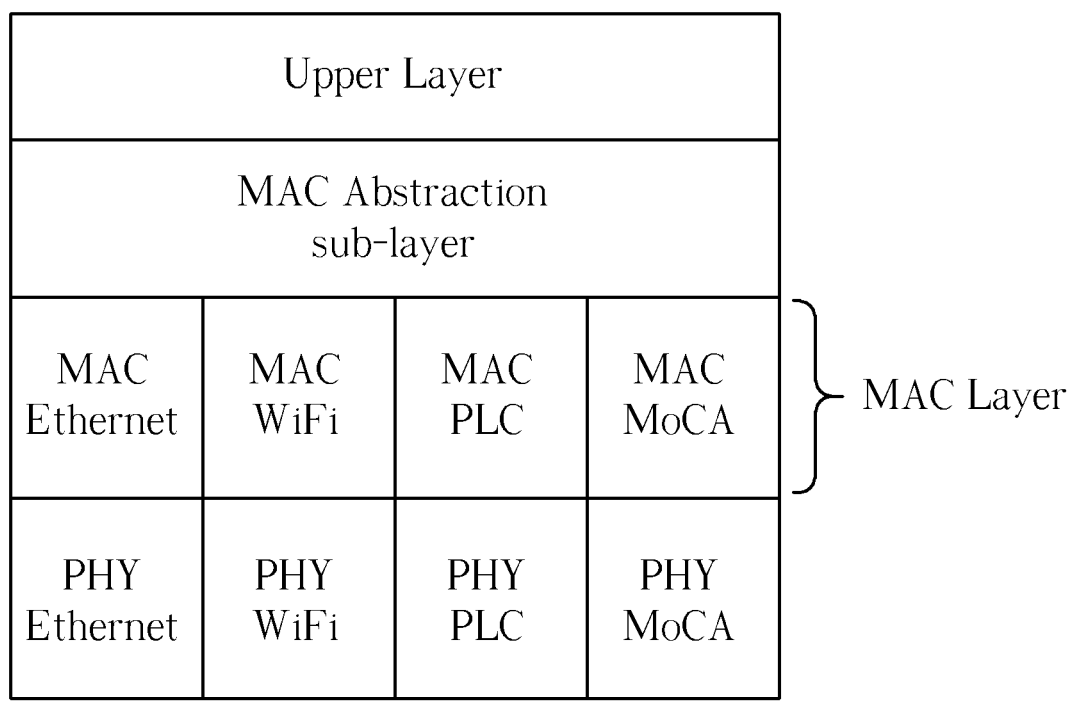
FIG. 1 is a schematic diagram of a communication device according to the prior art.
Figure 2:
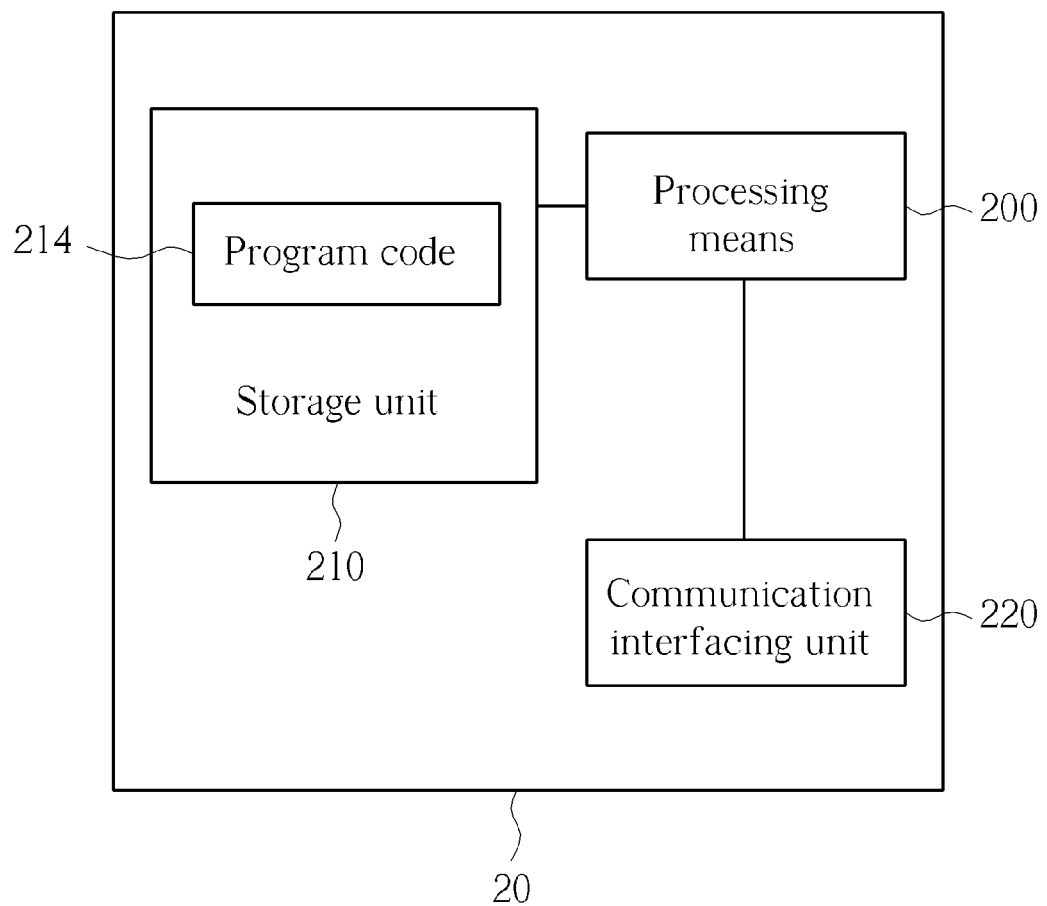
FIG. 2 is a schematic diagram of an exemplary communication device according to an example of the present invention.

Please refer to FIG. 2, which is a schematic diagram of an exemplary communication device 20 according to the present invention. The communication device 20 can be a device shown in FIG. 1. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with a unified terminal device or the network according to processing results of the processor 200.

Figure 3:
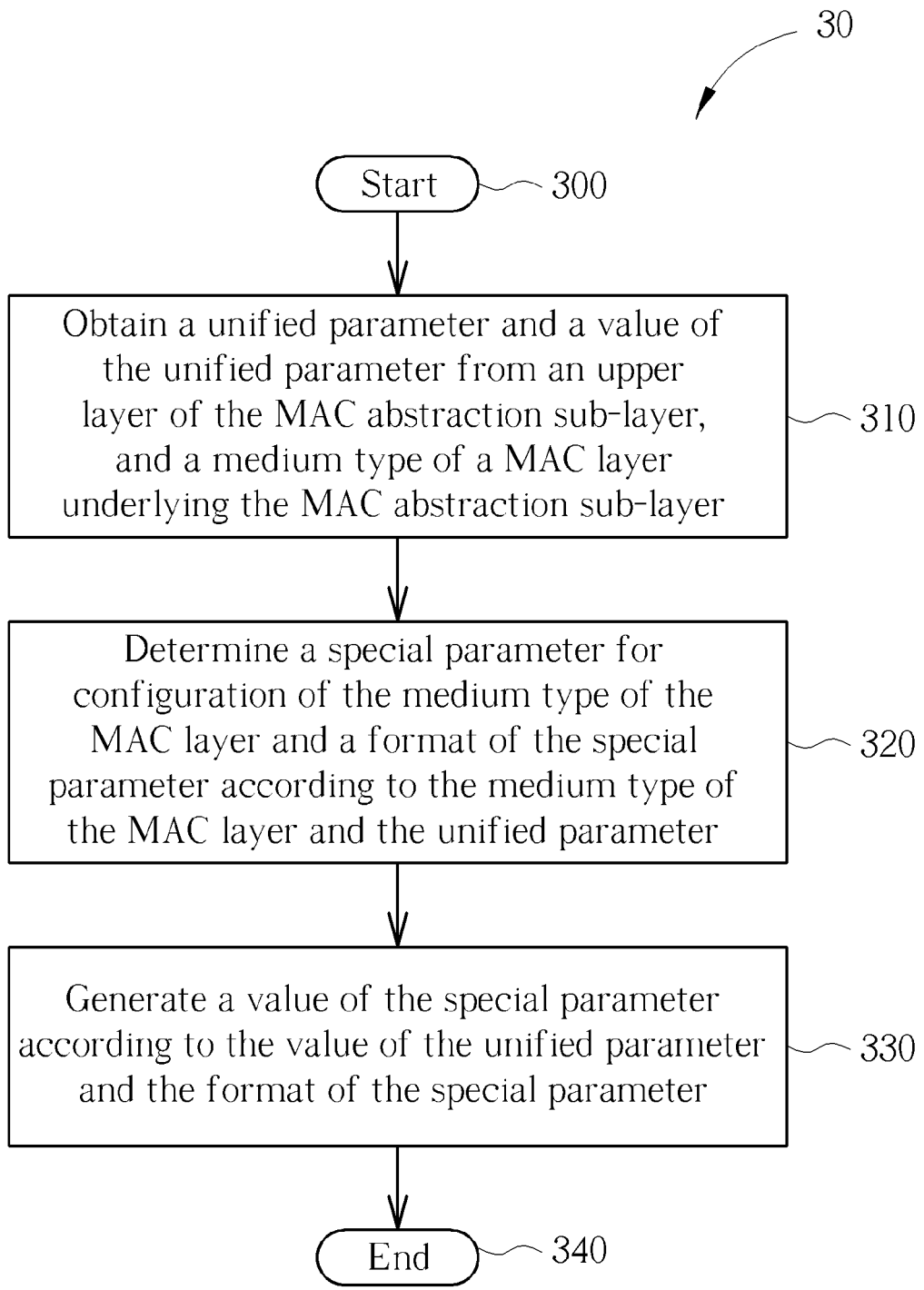
FIG. 3 is a flowchart of a unified parameter mapping process according to an example of the present invention.

Note that, the main idea of the present invention is to provide a method of unified parameter mapping in the MAC abstraction sub-layer. Please refer to FIG. 3, which is a flowchart of unified parameter mapping process 30 according to an example of the present invention. The unified parameter mapping process 30 is utilized in the MAC abstraction sub-layer shown in FIG. 1. The unified parameter mapping process 30 may be compiled into the program code 214 of FIG. 2 and includes the following steps:

Step 300: Start.

Step 310: Obtain a unified parameter and a value of the unified parameter from an upper layer of the MAC abstraction sub-layer, and a medium type of a MAC layer underlying the MAC abstraction sub-layer.

Step 320: Determine a special parameter for configuration of the medium type of the MAC layer and a format of the special parameter according to the medium type of the MAC layer and the unified parameter.

Step 330: Generate a value of the special parameter according to the value of the unified parameter and the format of the special parameter.

Step 340: End.

According to the unified parameter mapping process, the MAC abstraction sub-layer maps the obtained unified parameter to a special parameter corresponding to a medium type of the underlying MAC layer, and thereby configures the MAC layer with the special parameter. The MAC abstraction sub-layer obtains a unified parameter from the upper layer and a medium type of the underlying MAC layer by detection. Based on the detected medium type of the MAC layer and the unified parameter, the MAC abstraction sub-layer determines the special parameter and a corresponding format, and then generates the special parameter value according to the unified parameter value and the format of the special parameter.

For example, a special parameter named SSID in WiFi or NPW in PLC would be used when a user adds a device (i.e. the communication device 20) to a network. The MAC abstraction sub-layer obtains a unified parameter named UNID, which is inputted by a user from a user interface. With the unified parameter mapping process 30, the unified parameter UNID would be mapped to the special parameter SSID for WiFi or the special parameter NPW for PLC by the MAC abstraction sub-layer.

In an embodiment, the unified parameter mapping process 30 may be realized by hashing algorithm. Please refer to FIG. 4, which illustrates a unified parameter table 400 and a MAC type table 402. In FIG. 4, the unified parameter table 400 includes a unified parameter index column, a unified parameter column and a unified parameter value column. Unified parameter index column includes index value from '1' to 'N'. Each index value corresponds to a unified parameter, such as UNID, UNK, etc. The MAC type table 402 includes a MAC type index column and a MAC type column. MAC type index column includes index value from '1'-'M'. Each MAC type index value corresponds to a MAC type, such as WiFi, PCL, MoCA or Ethernet. In addition, please refer to FIG. 5, which illustrates a special parameter table 500. Note that, in FIG. 5, a unified parameter is mapped to different special parameter according to different MAC types. The special parameter table 500 includes a special parameter index column, special parameter name column, and a special parameter format column. Special parameter index column includes index value from '1' to 'N*M'. Each special parameter index value corresponds to a special parameter, such as SSID, NPW, etc. In addition, each special parameter corresponds to a special parameter format. That is, a value of the special parameter shall be conformed to the special parameter format. The format includes a length of the value of the special parameter and a type of the value of the special parameter. For example, in FIG. 5, the SSID is conformed to the format of '32-C', which indicates a value of the SSID is in a length of 32 bits, and with a character type. Moreover, the parameter type could be deci-number, hex-number, or boolean. Preferably, the unified parameter table 400, the MAC type table 402, and the special parameter table 500 are stored in the storage unit 210 of FIG. 2.

Figure 6:
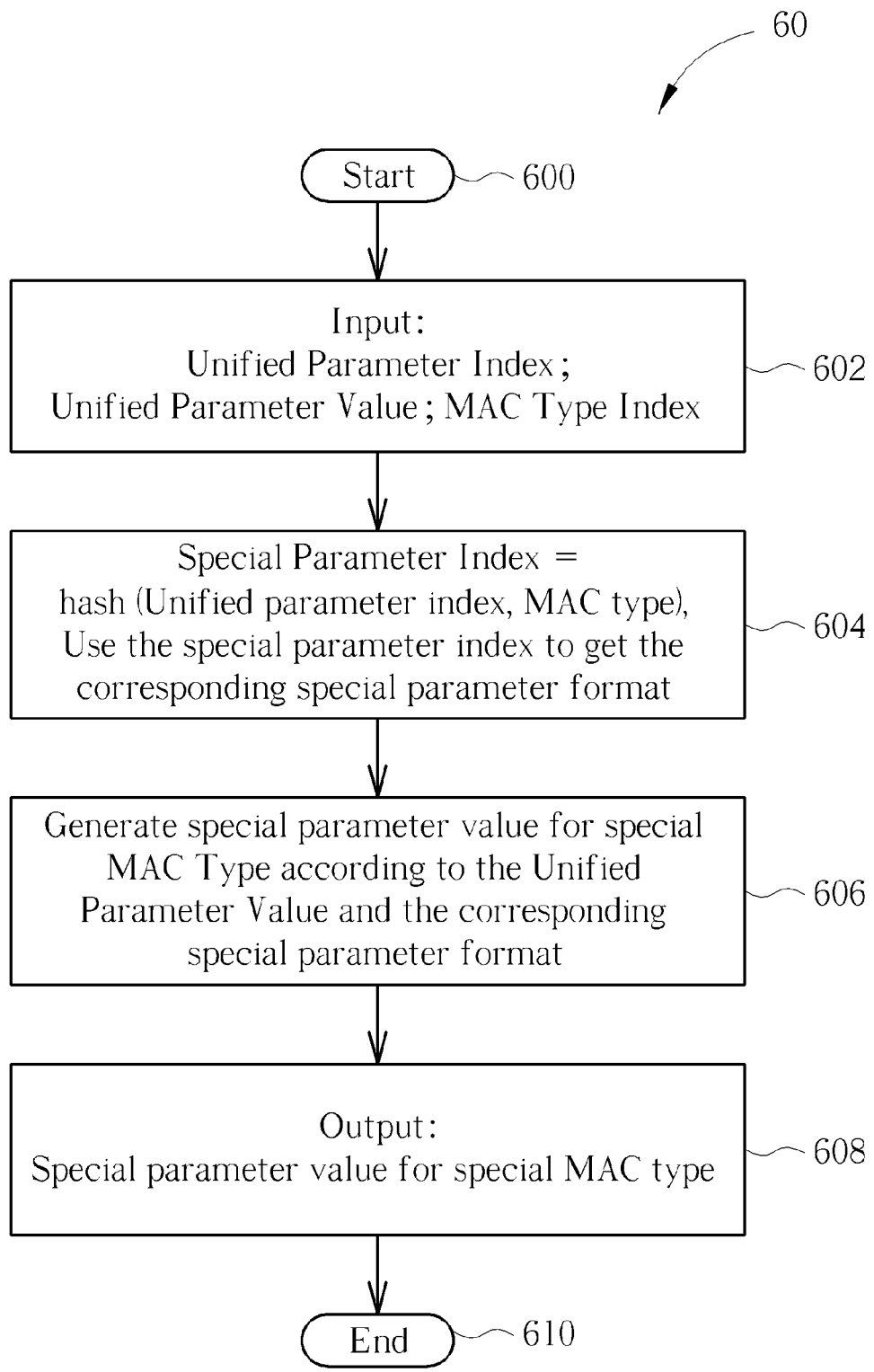
FIG. 6 is a schematic diagram of a mapping process with hashing algorithm according to an example of the present invention.

In addition, please refer to FIG. 6, which illustrates a mapping process 60 with hashing algorithm according to an example. When the MAC abstraction sub-layer obtains unified parameter value from a user interface and detects the underlying MAC type of the MAC layer, the MAC abstraction sub-layer determines the corresponding unified parameter index and MAC type index according to the unified parameter table 400 and a MAC type table 402 (step 602). After that, the MAC abstraction sub-layer determines a special parameter index corresponding to a special parameter by the hashing function:

Special parameter index=(Unified Parameter index−1)*MAC type number+MAC Type index, wherein the MAC type number represents a number of media converged with the MAC abstraction sub-layer.

With the special parameter index, the MAC abstraction sub-layer determines the corresponding special parameter format according to the special parameter table 500 (step 604). The MAC abstraction sub-layer generates a special parameter value for the detected MAC type of the MAC layer according to the unified parameter value and the special parameter format (step 606). More specifically, the MAC abstraction sub-layer generates the special parameter value by transforming the unified parameter value to conform the special parameter format. Finally, the MAC abstraction sub-layer configures the underlying MAC layer with the special parameter value (step 608).

Figure 7:
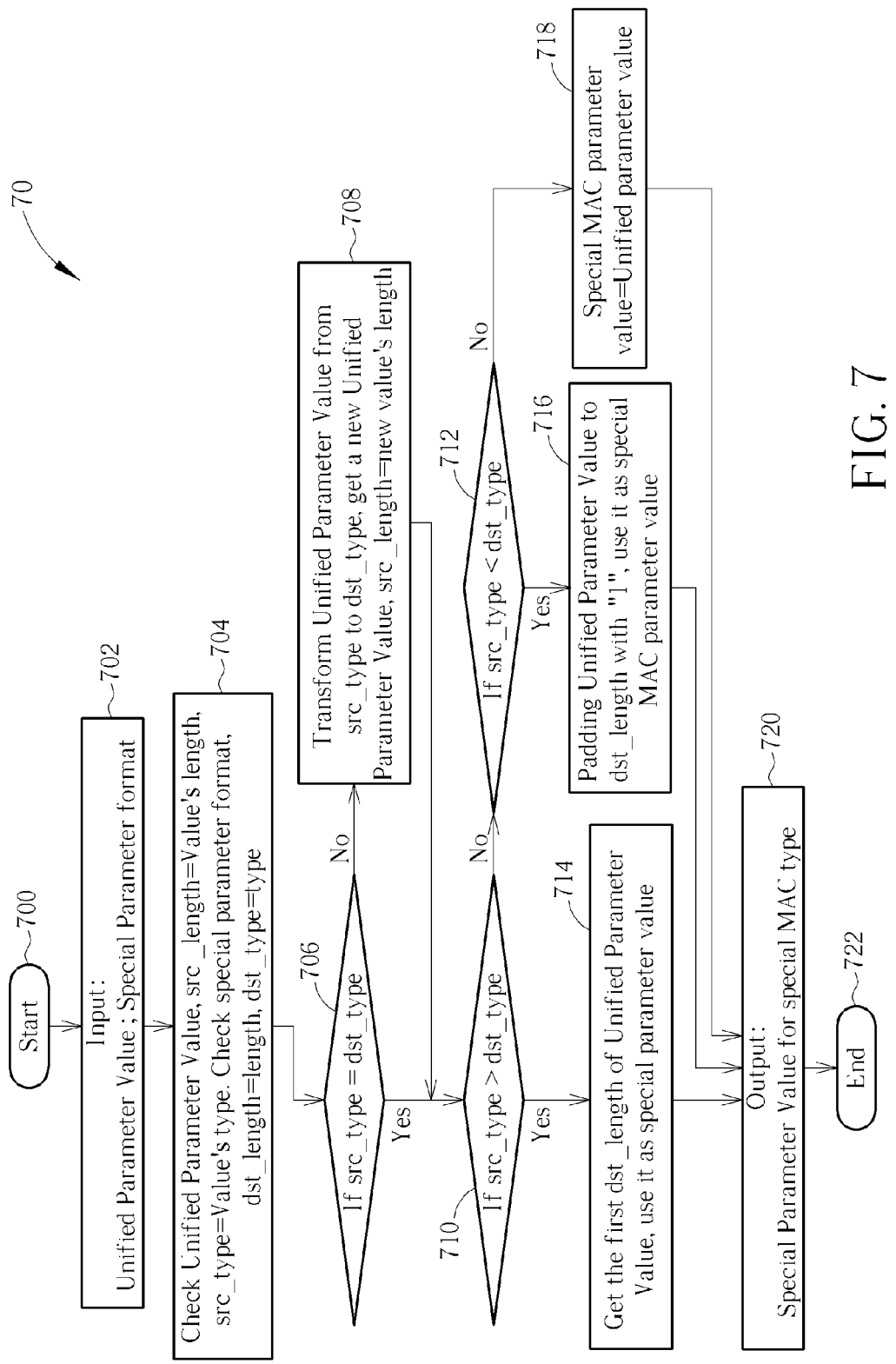
FIG. 7 is a schematic diagram of special parameter value generation according to an example of the present invention.

For the operation of generation of the special parameter value, please refer to FIG. 7. When the MAC abstraction sub-layer acquires the unified parameter value and the special parameter format, the MAC abstraction sub-layer checks a length and a type (i.e. character, deci-number, hex-number, or boolean) of the unified parameter value, and then sets src_length=unified parameter value length, src_type=unified parameter value type. In addition, the MAC abstraction sub-layer checks the special parameter format indicating a length and a type of the special parameter, and then sets the dst_length=special parameter length, dst_type=special parameter type (step 704). In addition, the MAC abstraction sub-layer determines whether the src_type is equivalent to dst_type (namely determining whether the unified parameter type is the same to the special parameter type) (step 706). If the src_type is not equivalent to dst_type, the MAC abstraction sub-layer transforms unified parameter value from src_type to dst_type, and gets a new unified parameter value. Further, the MAC abstraction sub-layer sets the src_length=new unified parameter value length (step 708) and goes to step 710. However, if the src_type is equivalent to dst_type, the MAC abstraction sub-layer further determines whether the src_length is greater than the dst_length (namely determining whether the unified parameter length is the same to the special parameter length) (step 710). If the src_length is greater than the dst_length, the MAC abstraction sub-layer gets the dst_length of the unified parameter value, and uses it as the special parameter value for configuration. On the other hand, if the src_length is not greater than the dst_length, the MAC abstraction sub-layer further determines whether the src_length is smaller than the dst_length. If the src_length is smaller than the dst_length, the MAC abstraction sub-layer pads unified parameter value to dst_length with "1", and used it as the special parameter value for configuration. If the src_length is not smaller than the dst_length, the MAC abstraction sub-layer directly use the unified parameter value as the special parameter value for configuration.

Figure 5:
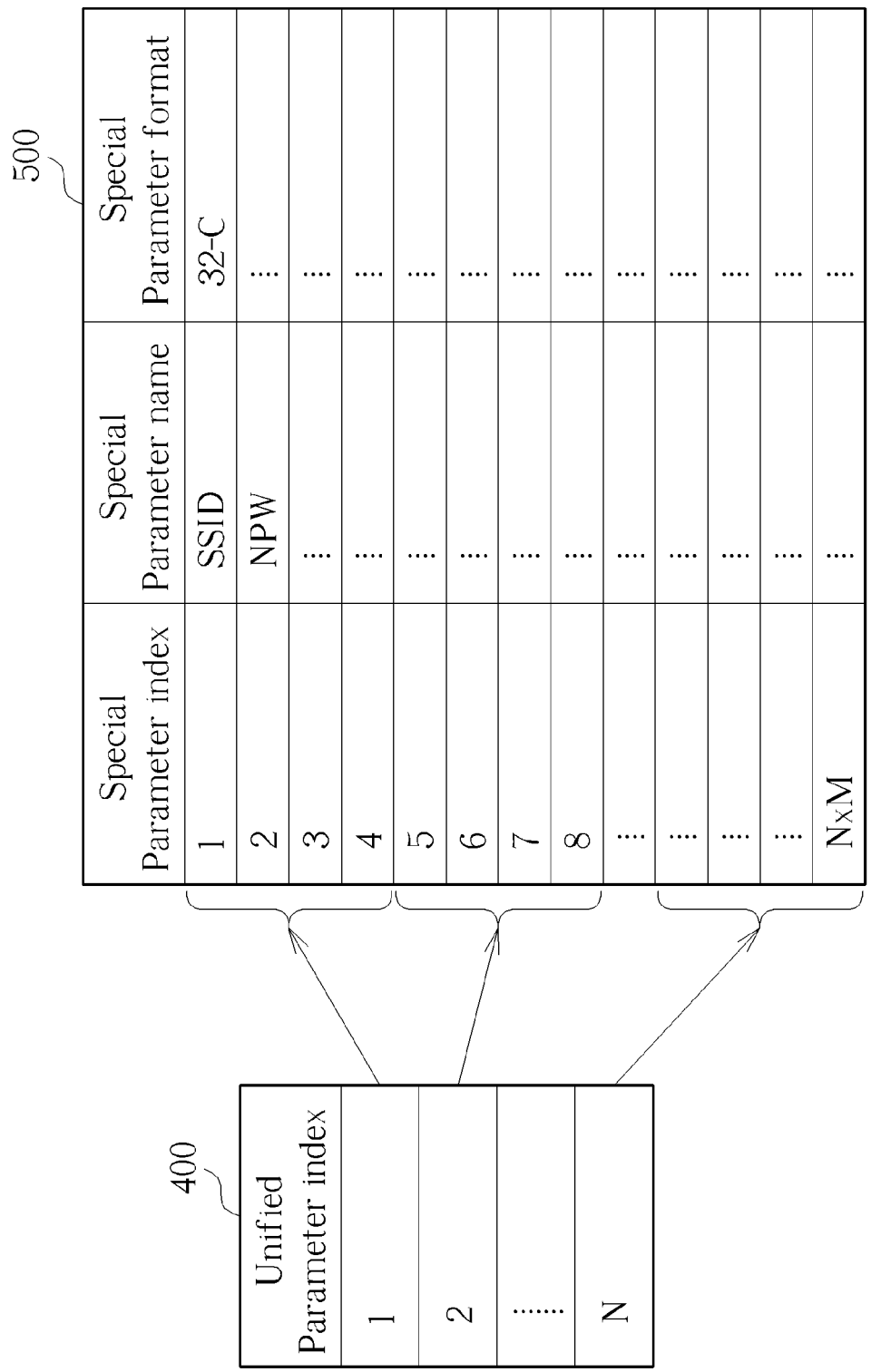
FIG. 5 is a schematic diagram of a special parameter table according to an example of the present invention.

Take an example based on the abovementioned mapping process 60. The purpose is to mapping the unified parameter "UNID" to the special parameter "SSID" in WiFi. Please refer back to FIGS. 4-5. Assume that the MAC abstraction sub-layer converges media including WiFi, PLC, MoCA, and Etherenet, and thereby the MAC type number is '4'. With the unified parameter table 400 and MAC type table 402 of FIG. 4, the MAC abstraction sub-layer obtains that MAC type index of the MAC type "WiFi" is '1', and unified parameter index of the unified parameter "UNID" is '1'. In addition, the UNID value is inputted as 'myUnifiedNetworkNo1'. By using the hashing function, the MAC abstraction sub-layer gets the special parameter index is '1' (namely "SSID"). After obtaining the special parameter index, the MAC abstraction sub-layer checks the special parameter table 500 of FIG. 5 to obtain the format of the special parameter "SSID". In FIG. 5, the format of the special parameter "SSID" is represented as '32-C'. Thus, the MAC abstraction sub-layer sets dst_type=character and dst_length=32. The MAC abstraction sub-layer determines that src_type is the same as the dst_type (namely both unified parameter and special parameter are in character type), but src_length is smaller then dst_length (namely the unified parameter value length is less than 32). In this situation, the UNID value is padded to dst_length with "1" to generate SSID value. That is, the SSID value is 'myUnifiedNetworkNo111111111111111', and used it for configuration of the MAC layer.

Please note that, those skilled in the art may realize the MAC type detection process by means of software, hardware or their combinations. More specifically, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of unified parameter mapping in the MAC abstraction sub-layer of a communication device. The unified parameter mapping method can automatically and efficiently map a unified MAC configuration to a special MAC configuration. Thus, the underlying MAC layer would be configured properly, so as to realize unified configuration experience provided in the MAC abstraction sub-layer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of unified parameter mapping for a communication device comprising a medium access control (MAC) abstraction sub-layer for converging a plurality of media in a network system, the method comprising steps of:
   obtaining a unified parameter and a value of the unified parameter from an upper layer of the MAC abstraction sub-layer, and a medium type of a MAC layer underlying the MAC abstraction sub-layer;
   determining a special parameter for configuration of the medium type of the MAC layer and a format of the special parameter according to the medium type of the MAC layer and the unified parameter; and
   generating a value of the special parameter according to the value of the unified parameter and the format of the special parameter.

2. The method of claim 1, further comprising steps of:
   determining a unified parameter index according to the unified parameter; and
   determining a MAC type index according to the medium type of the MAC layer.

3. The method of claim 2, wherein the step of determining the special parameter for configuration of the medium type of the MAC layer and the format of the special parameter according to the medium type of the MAC layer and the unified parameter comprises steps of:
   determining a special parameter index corresponding to the special parameter according to the unified parameter index, MAC type index and a number of the media converged with the MAC abstraction sub-layer; and
   determining the format of the special parameter according to the special parameter index.

4. The method of claim 3, wherein the step of determining the special parameter index corresponding to the special parameter according to the unified parameter index, MAC type index and the number of the media converged with the MAC abstraction sub-layer comprises steps of:
   obtaining the special parameter index by an equation:

Special parameter index=(unified parameter index−1)*MAC type number+MAC type index, wherein the MAC type number represents the number of the media.

5. The method of claim 3, wherein the step of determining the format of the special parameter according to the special parameter index comprises steps of:
   obtaining the format of the special parameter by a table predefined in the communication device and used for indicating the relation between special parameter indexes and corresponding formats.

6. The method of claim 1, wherein the format of the special parameter includes a length and a type of the special parameter.

7. The method of claim 6, wherein the step of generating the value of the special parameter according to the value of the unified parameter and the format of the special parameter comprises steps of:
   transforming the value of the unified parameter to conform to the length and the type of the format of the special parameter; and
   generating the value of the special parameter from the transformed value of the unified parameter.

8. The method of claim 1, wherein the step of generating the value of the special parameter according to the value of the unified parameter and the format of the special parameter comprises steps of:
   transforming the value of the unified parameter to conform to the format of the special parameter; and
   generating the value of the special parameter from the transformed value of the unified parameter.

* * * * *